US006745083B2

(12) United States Patent
Eckardt et al.

(10) Patent No.: US 6,745,083 B2
(45) Date of Patent: Jun. 1, 2004

(54) METHOD AND DEVICE FOR SAFELY MONITORING A SPEED OF AN ELECTRIC MACHINE

(75) Inventors: Dieter Eckardt, Herzogenaurach (DE); Carsten Rebbereh, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/124,052

(22) Filed: Apr. 17, 2002

(65) Prior Publication Data

US 2002/0161492 A1 Oct. 31, 2002

(30) Foreign Application Priority Data

Apr. 25, 2001 (DE) .......................................... 101 20 283
Dec. 20, 2001 (DE) .......................................... 101 63 010

(51) Int. Cl.$^7$ ............................................. G05B 19/18
(52) U.S. Cl. ................................. 700/2; 700/4; 700/21; 700/79
(58) Field of Search ................................. 700/2, 19, 75, 700/304, 21, 79, 177; 73/488; 324/160, 161, 166

(56) References Cited

U.S. PATENT DOCUMENTS 4,849,891 A * 7/1989 Krohn et al. .................. 701/89
5,050,427 A * 9/1991 Cote et al. .................. 73/118.1
5,304,907 A * 4/1994 Abe et al. .................... 318/611
5,312,172 A * 5/1994 Takeuchi .................. 303/113.1
5,585,709 A 12/1996 Jansen et al. ................ 318/807
5,619,131 A 4/1997 Lelle et al. .................. 324/174
5,884,986 A * 3/1999 Shimizu ................. 303/122.12
6,154,696 A * 11/2000 Nishi et al. .................... 701/41
6,499,815 B1 * 12/2002 Daigle ......................... 303/151

FOREIGN PATENT DOCUMENTS

DE  4322146  1/1995
DE  4330823  3/1995

* cited by examiner

*Primary Examiner*—William Grant
*Assistant Examiner*—Ronald D Hartman, Jr.
(74) *Attorney, Agent, or Firm*—Henry M. Feiereisen

(57) ABSTRACT

In a method and device for monitoring speed, in particular for monitoring the rotation speed of an electric machine, two processors are employed which monitor the speed using different checking modes and cross-compare results. The first processor executes a conventional control algorithm and checks on the basis of an estimated or measured value of the speed whether a speed limit has been exceeded. The second processor determines the actual output frequency, which is also indicative of the speed, of a converter either from actual current values, which are measured anyway, or by reconstructing the voltage from control signals of transistors. Both processors thus monitor if a rotation speed limit has been exceeded and/or execute corresponding response actions. The method also recognizes faults in the power section based on the evaluation of the phase current. The system can also be designed to manage pulling loads.

21 Claims, 3 Drawing Sheets

METHOD AND DEVICE FOR SAFELY MONITORING A SPEED OF AN ELECTRIC MACHINE

CROSS-REFERENCES TO RELATED APPLICATIONS

This application claims the priority of German Patent Applications, Serial No. 101 20 283.0, filed Apr. 25, 2001, and 101 63 010.7, filed Dec. 20, 2001, pursuant to 35 U.S.C. 119(a)–(d), the subject matter of which is incorporated herein by reference.

BACKGROUND OF THE INVENTION

The present invention relates to a method for safely monitoring a speed of an electric machine with a system having two processors which cross-compare results and are connected to each other via a communication link. The present invention also relates to a device for carrying out the method.

A conventional method for monitoring the speed limit of an electric machine requires a transducer to not only control the rotation speed, but also to monitor the rotation speed. A conventional device of this type is illustrated in FIG. 3. A processor 1 operates as a controller 11 which receives as input values nominal values 5 and controls a machine 7 (in this example a three-phase machine) via a pulse generator 9 and a converter 8. Corresponding actual values derived from the phase current are returned to the controller 11. Transducer signals are supplied by the transducer 27 via a connected transducer processing circuit 28 to the controller 11 as well as to an additional unit 29 for fault detection. The controller also supplies values to the unit 29. The occurrence of only one fault—namely a malfunction of the controller 11 or the transducer 27—can be detected based on an inconsistency between the data from the transducer and the data from the controller.

However, if the drive is to be operated without a transducer, then the situation becomes more complex (see FIG. 4). One conventional approach involves the use of two identical structures which are supplied with identical input data, and the process data and the results are cross-compared. As shown in FIG. 4, nominal values 5 are supplied simultaneously to both the processor 1, which includes the controller 11, and to a second processor 2, which includes an additional controller 30. The data are cross-compared via a communication link 19 connecting the two processors 1 and 2. Pulse generators 9 and 31 generate control signals, which are supplied to an input of a unit 32 for performing logical operations and identifying deviations. The entire control set is here implemented in redundant from, the two resulting sets of control signals for the transistors of the converter 8 are logically combined and thereby tested for faults. The transistors are controlled only by the signals of the first control set and/or the first pulse generator 9. The converter controls the machine 7 by returning to the controller 11 corresponding actual values derived from the phase currents.

A malfunction in the aforedescribed system can be identified with this method. However, problems that arise from pulling loads cannot be managed in this manner.

It would therefore be desirable and advantageous to provide an improved process which obviates prior art shortcomings and is able to safely reduce a speed of an electric machine.

It would also be desirable and advantageous to provide an improved process to recognize the fault and to safely switch off the drive.

In the following description, the term "safely" is to be understood to satisfy the "single-error-safety" principle, wherein the process continuously performs a self-check and irreversibly disconnects or disables the system when a single error or a critical fault is detected. In the present example, a predetermined speed limit value must not be exceeded even in the event of a single fault in the system.

SUMMARY OF THE INVENTION

According to one aspect of the present invention, a method for monitoring a speed of an electric machine with two processors, includes the steps of connecting a first of the two processors with the second processor via a communication link; monitoring the speed in a first checking mode using the first processor; monitoring the speed in a second checking mode using the second processor, wherein the first and second checking modes are different; and cross-comparing results derived by the first and second processor.

The present invention solves prior art shortcomings by providing a system with two processors to safely monitor the speed of an electric machine and to cross-compares the results, wherein the two processors are connected via a communication link and monitor the operation in a different manner.

According to another feature of the present invention, a first one of the processors may execute a conventional control algorithm and monitor based on an estimated or measured rotation speed value if the rotation speed exceeds a limit value and /or initiates response actions if this limit value is exceeded, whereas the second one of the processors determines the actual output frequency of an associated converter using the actual current values and, like the first processor, monitors a limit value and/or initiates corresponding response actions, if this limit value is exceeded.

Suitably, the output frequency may be determined by defining a current vector from at least two measured phase currents. The actual output frequency is determined by computing the time derivative of the angle of the current vector. The angle signal is advantageously low-pass filtered before the time derivative is computed.

As an alternative, the first processor may execute a conventional control algorithm and monitor based on an estimated or measured rotation speed value if the rotation speed limit is actually exceeded and/or initiates corresponding response actions, whereas the second processor may determine the actual output frequency of an associated converter reconstructing the voltage of the control signals of the system, and like the first processor monitors if a limit value is exceeded and/or initiates corresponding response actions. In this case, the voltage of control signals of the system can be reconstructed by suitable filtering, in particular by filtering with a P-T1 element that has a cutoff frequency which is greater than the maximum output frequency, but less than the pulse repetition frequency of the converter.

Suitably, the control signals are evaluated by only two current valves, e.g. transistors, located in different branches of a bridge circuit of the converter. Of course, the control signals may also be evaluated by more than two transistors.

The speed of a synchronous machine can be safely monitored by assuming that the actual rotation speed is equal to the measured output frequency and by switching off the converter, when excessively high compensating currents indicate that the machine is out of synchronization. To safely monitor the speed of an asynchronous machine in generator operation, the asynchronous machine can be designed so that torque accompanying a pulling load can still be controlled, even when the asynchronous machine, that may be designed for three phases, operates with less than three phases, for example, only with two phases.

It has been found beneficial in all cases when a nominal value of the rotation speed is limited to a predetermined limit value by the first and second processor on dual channels.

According to another feature of the present invention, the two processors operate with an identical time base. Pulse generators in both processors generate pulse signals which are supplied to the respective other processor for comparison with a nominal pulse signal value, whereby the machine is safely stopped in the event of a discrepancy, in particular when the discrepancy is greater than a predetermined tolerance threshold.

According to another aspect of the present invention, a device for safely monitoring a speed includes a system of two processors which are connected via a communication link so that the process results can be cross-compared, whereby the first and second processor are so programmed as to perform the monitoring process in different checking modes.

According to another feature of the present invention, the first processor may execute a conventional control algorithm and the rotation speed can be monitored based on an estimated or measured value to detect an excess rotation speed, whereas the second processor may determine an actual output frequency of a converter of the system from the actual current values, whereby analog to the first processor, a limit value can be monitored and/or associated response actions can be initiated, when the limit value is exceeded.

As an alternative thereto, the first processor may execute a conventional control algorithm and the rotation speed can be monitored based on an estimated or measured value to detect an excess rotation speed, whereas the second processor determines the corresponding actual output frequency of a converter of the system by a reconstructing the voltage of transistors associated with the control signals, whereby analog to the first processor, a limit value can be monitored and/or associated response actions can be initiated, when the limit value is exceeded.

According to yet another feature of the invention, there may be provided a numeric control system, which includes a control processor to operate as the first processor of the controller, and a communication processor, which is provided for a communication connection to operate as the second processor, or vice versa.

With the aforedescribed method, the functionality "safely reduced speed" can advantageously be implemented with very little additional hardware. In particular, no additional transducer is required and there is no need to duplicate any components of the controller. The method also recognizes faults in the power section based on the evaluation of the phase currents. In addition, pulling loads can be controlled with a suitable design of the system.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
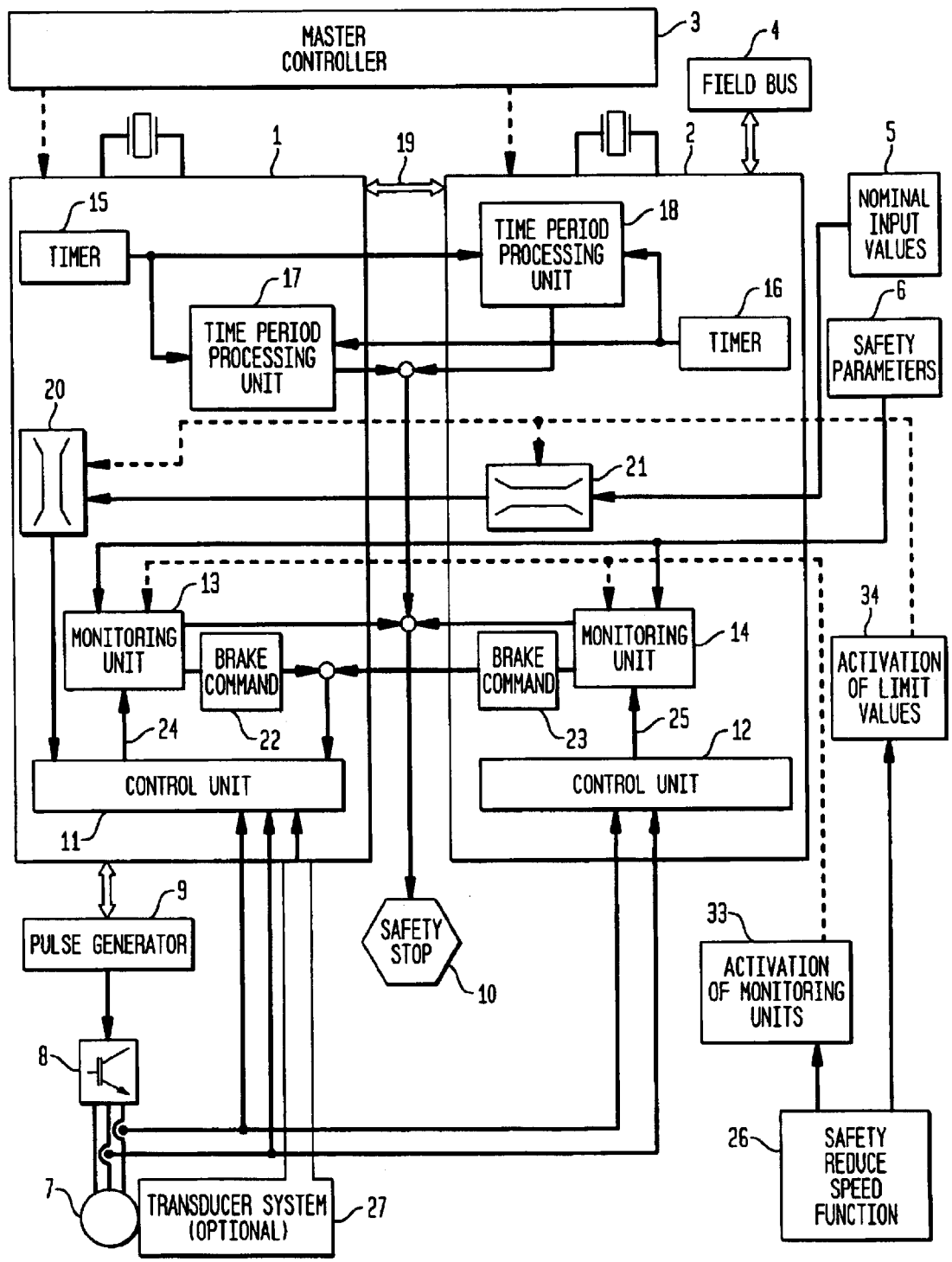
FIG. 1 is a schematic block diagram of one embodiment of a device according to the present invention for safely monitoring the speed, using a current measurement.

Throughout all the Figures, same or corresponding elements are generally indicated by same reference numerals.

Figure 2:
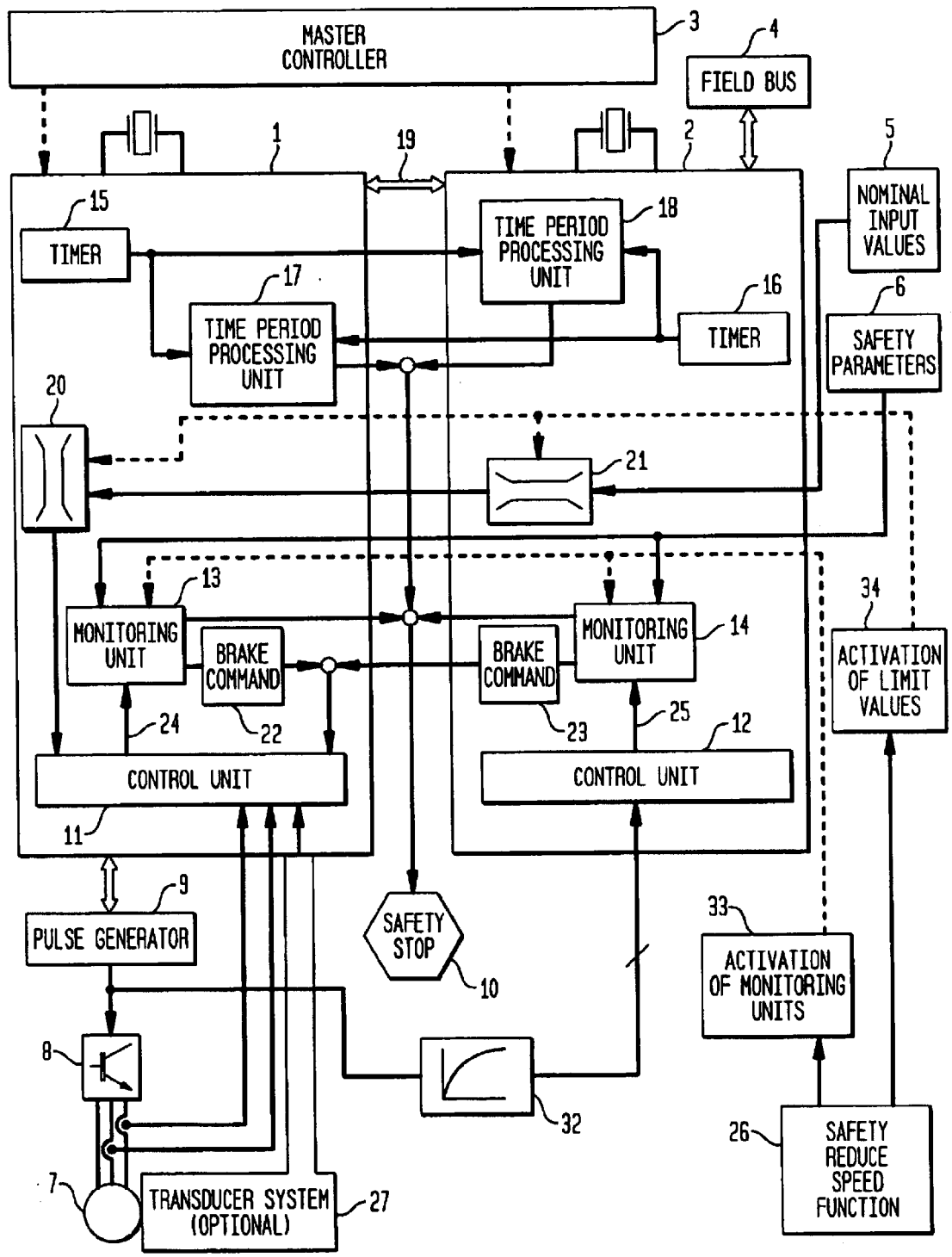
FIG. 2 is a schematic block diagram of another embodiment of a device according to the present invention for safely monitoring the speed, using a voltage measurement.
Figure 3:
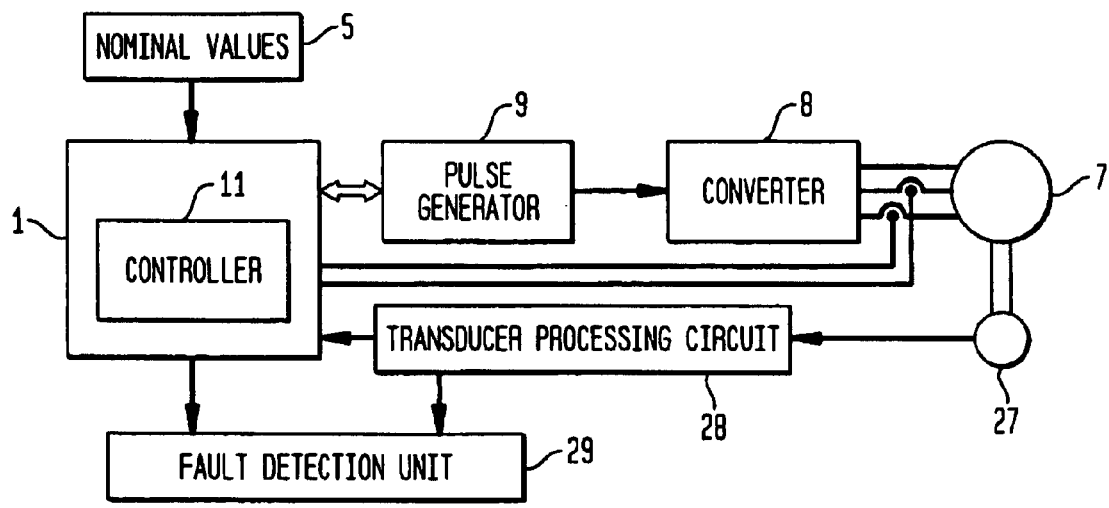
FIG. 3 is a conventional monitoring arrangement with a transducer.
Figure 4:
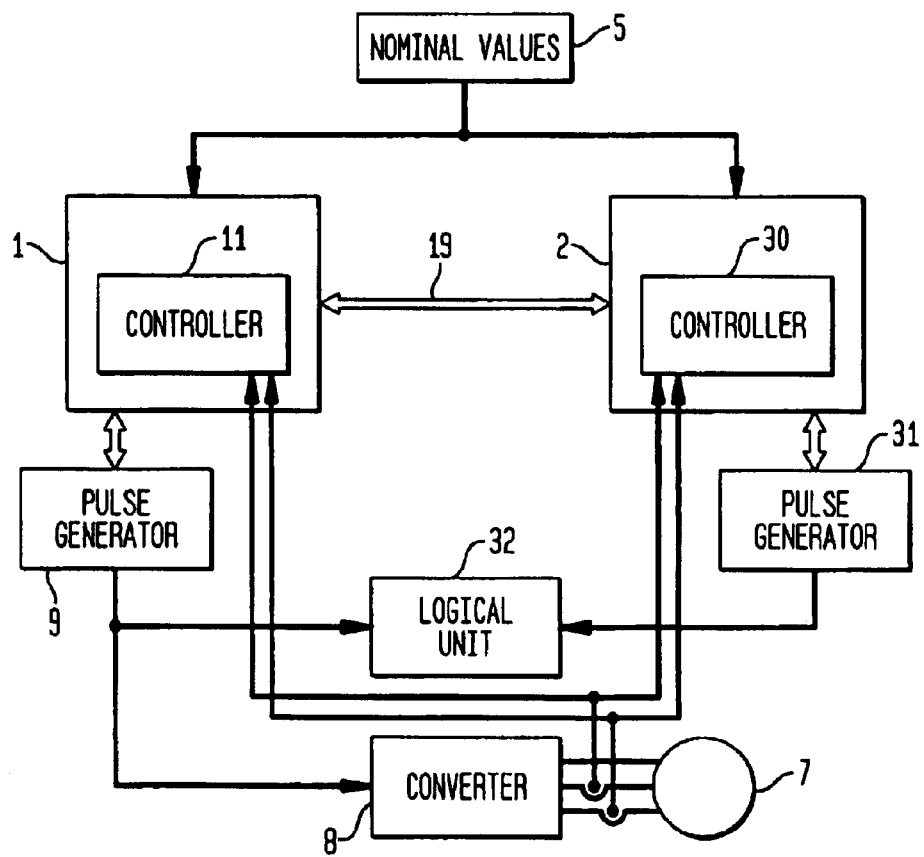
FIG. 4 is a conventional monitoring arrangement without a transducer.

The invention is directed to a method and device for monitoring speed. In particular, the method and device described herein can safely monitor the rotation speed of an electric machine using two processors, which unlike conventional solutions monitors the speed limit in different checking modes and cross-compares the results. FIG. 1 and FIG. 2 show schematic block circuit diagrams of two exemplary embodiments of the invention.

In the block diagrams of FIGS. 1 and 2, the two processors 1, 2 are connected via a communication link 19 which may be a parallel connection or also a serial connection which is not necessarily safer. The two processors 1, 2 need not be arranged in close proximity to one another. Both processors 1, 2 are controlled by a master controller 3 and receive nominal input values 5. Associated with the respective processors 1, 2 are monitoring units 13, 14, respectively, to receive safety parameters 6. The monitoring units 13, 14 are designed to initiate a safe stop 10 and to output brake commands 22, 23 which are executed by corresponding control units 11, 12. In accordance with one exemplary embodiment, only the first processor 1 controls a pulse generator 9, a converter 8 and a machine 7. Although incorporated in the system of FIG. 1, a transducer system 27 is optional and not required for the operation of the system of the invention.

The first processor 1 executes a conventional control algorithm of the control unit 11. The monitoring unit 13 monitors based on an estimated or measured rotation speed value (e.g., estimated value 24 of the stator frequency) when a rotation speed limit is exceeded. In the event that the speed limit is exceeded, the brake command 22 is initially transmitted to the control unit 11. When the rotation speed reaches 0 or an inadequate braking action is detected, a safe stop 10 is instituted.

The second processor 2 determines the actual output frequency of converter either from the actual current values (which are measured anyway, as indicated in FIG. 1, or from a reconstruction of the voltage from the control signals of the transistors, as indicated in FIG. 2. The second processor 2, like the first processor 1, includes a monitoring unit 14 that monitors if a limit value has been exceeded and initiates corresponding response actions when the limit value has actually been exceeded.

The processor 2 determines the output frequency, for example, on the basis of the measured currents as indicated in FIG. 1, by calculating the current vector from the (typically two) measured phase currents. The phase currents are cyclically sampled and the measured values are digitized. The time derivative of the angle of the current vector is equal to the desired output frequency. The individual signals can be low-pass filtered to eliminate problems with the differentiation. These operations are performed in a unit 12 for determining the signal frequency and for monitoring whether the signals are plausible. The unit 12 supplies a measurement value 25 of the stator frequency to the monitoring unit 14. The phase relationship between the two currents can be determined based on the measurement of two phase currents, so that the failure of one of the three phases can be detected. Accordingly, faults in the power section also detected.

As an alternative, the voltage signals can be evaluated, as indicated in the embodiment depicted in FIG. 2, which corresponds essentially to that of FIG. 1, except for the determination of the output frequency. In this case, the corresponding voltages are reconstructed by suitable filtering from the control signals of the transistors that are supplied by the pulse generator 9. Two transistors arranged in different branches of the bridge circuit are sufficient for this purpose.

In the simplest case, the filter 32 can be implemented as a P-T1 element with a suitably low cutoff frequency, which should be greater than the maximum output frequency, but significantly smaller than the pulse repetition frequency. Faults in the power section cannot be determined with this method because only the control signals of the transistors are evaluated. However, such faults can be detected using the control and protection mechanisms of the converter 8, since these mechanisms also evaluate the actual electrical currents.

The actual rotation speed of the motor can be determined by monitoring the output frequency for the following reasons:

- for synchronous machines, the (electrical) rotation speed is identical to the frequency of the output voltage; high compensating currents indicate a fault whereby the machine has fallen out of synchronization, and the converter is disconnected,
- for asynchronous machines, the (electrical) rotation speed is different from the output frequency of the converter due to slip; in motor operation, the rotation speed is always less than the frequency of the voltage, which does not cause safety problems; generator operation leads to a super-synchronous operating state, wherein a maximum limit was considered in the project phase and can therefore be safely managed through suitable selection of the limit value,
- if a wire breaks in an asynchronous machine, then the machine has a smaller torque than in normal operation; accordingly, the rotation speed in motor operation will always be less than under fault-free conditions; however, there is a risk that the permissible rotation speed limit is exceeded in generator operation, because the torque of the machine is no longer sufficient to brake a pulling load; the torque of pulling loads must therefore be limited to values that can be safely handled by two-phase machines. The present method is able to manage pulling loads if this limitation is taken into consideration when the system is designed. However, this fault can only be safely recognized if the current is measured.

When the function 26 "safely reduced speed" is activated, the monitoring units 13, 14 are activated 33 and the nominal rotation speed is restricted to the limit value (limits 20 and 21 with activation 34) in dual channels (one channel in processor 2, subsequently the second channel in processor 1), so that the controller reliably receives a correct nominal value.

When the safely reduced speed is activated starting from a rotation speed that is greater than the rotation speed limit, then the rotation speed has to be reduced first by a braking operation to the rotation speed limit. It is possible to monitor continuously whether the motor 7 is actually be decelerated with the desired rate, and to perform a safety stop 10 of the motor 7 if such is not the case.

The correct cooperation between the two processors 1 and 2 relies on the accuracy of the time bases. Timers 15 and 16 associated with the processors 1, 2 generate corresponding timing signals which are supplied to the respective other processor for evaluation. This other processor determines the time period of the signal (units 17 and 18) and compares the time period with the known nominal value. If the deviation is greater than a tolerance limit, then one of the time bases is out of tune, and a safe stop 10 has to be performed.

In addition to the aforedescribed safety measures, an optional master controller 3 can cyclically check the relevant safety parameters in both processors and, if necessary, halt the operation.

In accordance with a particular embodiment, the processor 1 may be constituted by the processor which is provided anyway to perform the control functions, whereas the processor 2 is implemented by the communication processor which is also already provided and used to connect to a field bus 4.

In the aforedescribed embodiments, two processors (the processor type is not essential for the invention and the processors can also be identical) perform a monitoring function in different ways. In an alternative embodiment, two different processors can be employed that have a different design or are made by different manufacturers. These different processors can then monitor the motor operation in the same way or in different ways. For example, the effects stemming from systematic faults in one processor type can be eliminated by employing two processors of different type that perform the monitoring function in the same manner.

While the invention has been illustrated and described as embodied in a method and system for safely monitoring a speed of an electric machine, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for monitoring a speed of an electric machine, comprising the steps of:

providing a communication link to connect two processors;

configuring a first one of the processors to monitor the speed in accordance with a first checking mode;

configuring a second one of the processors to monitor the speed in accordance with a second checking mode, wherein the first and second checking modes are different; and cross-comparing results derived by the first and second processors, wherein the first checking mode includes executing a conventional control algorithm, checking on the basis of an estimated or measured value of the speed whether a speed limit has been exceeded, and executing a response action, when the speed limit has been exceeded, and wherein the second checking mode includes determining from actual current values an actual output frequency of an associated converter, checking on the basis of the actual output frequency whether the speed limit has been exceeded, and executing a response action, when the speed limit has been exceeded.

2. The method of claim 1, wherein the actual output frequency is determined by establishing a current vector from at least two measured phase currents, and ascertaining the actual output frequency from a time derivative of an angle of the current vector.

3. The method of claim 2, and further comprising the step of performing a low-pass filtering operation before forming the time derivative.

4. The method of claim 1, wherein an actual speed is assumed to be identical to the determined actual output frequency, and further comprising the steps of measuring a compensating current; determining if the compensating current exceeds a predetermined value that indicates a falling out of synchronization; and switching off the converter when the compensating current exceeds the predetermined value.

5. The method of claim 1, for application in an asynchronous machine in generator operation with a pulling load, wherein the asynchronous machine is configured to handle a torque produced by the pulling load when operating on two phases.

6. The method of claim 1, wherein the first and second processors operate on dual channels and limit a nominal speed value to a predetermined limit value.

7. The method of claim 1, wherein the first processor generates first timing signals and the second processor generates second timing signals, with the first and second timing signals based on a common time base, wherein the first and second processors transmit the timing signals to the respective other processor for comparison with a nominal timing signal value; and wherein a safe stop is performed in the event that a discrepancy between the first and second timing signals is greater than a predetermined tolerance threshold.

8. The method of claim 1, wherein the response action of the first and second processors includes at least one of braking and stopping.

9. A method for monitoring a speed of an electric machine, comprising the steps of:
providing a communication link to connect two processors;
configuring a first one of the processors to monitor the speed in accordance with a first checking mode;
configuring a second one of the processors to monitor the speed in accordance with a second checking mode, wherein the first and second checking modes are different; and
cross-comparing results derived by the first and second processors,
wherein the first checking mode includes executing a conventional control algorithm, checking on the basis of an estimated or measured value of the speed whether a speed limit has been exceeded, and executing a response action when the speed limit has been exceeded, and
wherein the second checking mode includes reproducing a voltage of a control signal and determining an actual output frequency of a converter from the reproduced voltage of the control signal, checking on the basis of the actual output frequency whether the speed limit has been exceeded, and executing a response action, when the actual output frequency is commensurate with a speed that exceeds the speed limit.

10. The method of claim 9, wherein reproducing the voltage of the control signals includes performing a suitable filtering operation with a P-T1 element having a cutoff frequency which is greater than a maximum output frequency and less than a pulse repetition frequency of the converter.

11. The method of claim 9, and further comprising the step of evaluating the control signal from at least two current valves located in different branches of a bridge circuit of the converter.

12. The method of claim 5, wherein an actual speed is assumed to be identical to the determined actual output frequency, and further comprising the steps of measuring a compensating current; determining if the compensating current exceeds a predetermined value that indicates a falling out of synchronization; and switching off the converter when the compensating current exceeds the predetermined value.

13. The method of claim 9, wherein the first and the second processor operate on dual channels and limit a nominal speed value to a predetermined limit value.

14. The method of claim 9, wherein the response action of the first and second processors includes at least one of braking and stopping.

15. The method of claim 9, for application in an asynchronous machine in generator operation with a pulling load, wherein the asynchronous machine is configured to handle a torque produced by the pulling load when operating on two phases.

16. The method of claim 9, wherein the first and second processors operate on dual channels and limit a nominal speed value to a predetermined limit value.

17. The method of claim 9, wherein the first processor generates first timing signals and the second processor generates second timing signals, with the first and second timing signals based on a common time base, wherein the first and second processors transmit the timing signals to the respective other processor for comparison with a nominal timing signal value; and wherein a safe stop is performed in the event that a discrepancy between the first and second timing signals is greater than a predetermined tolerance threshold.

18. A device for monitoring a speed of an electric machine, comprising:
a first processor performing a first monitoring function;
a second processor performing a second monitoring function different from the first monitoring function; and
a communication link connecting the first processor and the second processor, said communication link exchanging measurement results between the first processor and the second processor for cross-comparing the measurement results,
wherein the first processor includes a first monitoring unit which executes a conventional control algorithm adapted to check a speed on the basis of an estimated or measured speed value and to trigger a response action, when the speed checked by the first monitoring unit is greater than a predetermined speed limit, and
wherein the second processor includes a second monitoring unit which measures actual current values to determine an actual output frequency of a converter, with the second monitoring unit adapted to check the speed on the basis of the actual output frequency and to trigger a response action, when the speed checked by the second monitoring unit is greater than a predetermined speed limit.

19. The device of claim 18, wherein the response action includes at least one of braking and stopping.

20. A device for monitoring the speed of an electric machine, comprising:

a first processor performing a first monitoring function;

a second processor performing a second monitoring function different from the first monitoring function; and a communication link connecting the first processor and the second processor, said communication link exchanging measurement results between the first processor and the second processor for cross-comparing the measurement results, wherein the first processor includes a first monitoring unit which executes a conventional control algorithm adapted to check a speed on the basis of an estimated or measured speed value and to trigger a response action, when the speed checked by the first monitoring unit is greater than a predetermined speed limit; and wherein the second processor includes a second monitoring unit which reconstructs a voltage of control signals of transistors associated with a converter to determine an actual output frequency of the converter and to trigger a response action when the actual output frequency is commensurate with a speed that is greater than a predetermined speed limit.

21. The device of claim 20, wherein the response action includes at least one of braking and stopping.

* * * * *